Oct. 18, 1949.        T. J. LEHANE         2,485,003
                THERMOSTAT CONTROL CIRCUIT
                   Filed Dec. 16, 1946

Inventor:
Timothy J. Lehane
By Harvey M. Gillespie  Atty.

Patented Oct. 18, 1949

2,485,003

UNITED STATES PATENT OFFICE 2,485,003

THERMOSTAT CONTROL CIRCUIT

Timothy J. Lehane, Chicago, Ill., assignor, by mesne assignments, to Vapor Heating Corporation, a corporation of Delaware Application December 16, 1946, Serial No. 716,474

5 Claims. (Cl. 236—1)

This invention relates to an apparatus for controlling the temperature of an enclosed space and has to do particularly with the provision of improved thermostatically controlled circuits for controlling the functioning of a temperature altering means in relation to the temperature of said space.

A principal object of the invention is to provide improvements, in apparatus of the above character, for thermostatically closing an energizing circuit through a temperature altering means when the enclosed space reaches a predetermined temperature and for maintaining said circuit closed so long as the temperature of the enclosed space remains within a predetermined range from the temperature at which the said energizing circuit was closed.

A more specific object of the invention is to provide, in a control apparatus of the above character, a simplified circuit for thermostatically closing an energizing circuit through a temperature altering means and for simultaneously adding a predetermined quantity of heat to the thermostat so that it will remain closed and thereby keep the said energizing circuit effective so long as the temperature of the enclosed space remains within a predetermined range from the temperature at which the energizing circuit was closed.

A further object is to provide improved thermostatically controlled circuits for controlling the functioning of a temperature altering means in relation to the temperature of an enclosed space, which circuits are adaptable for use with temperature altering means which cools the enclosed space or with temperature altering means which operate to heat the space.

According to the invention, the temperature of an enclosed space is maintained with a predetermined temperature range, for example, between the temperatures of 50° to 60° Fahrenheit, by circulating a coolant medium or a heating medium through a heat exchanger arranged within the enclosed space whose temperature is being controlled.

The invention is illustrated in the accompanying drawings wherein.

Figure 1:
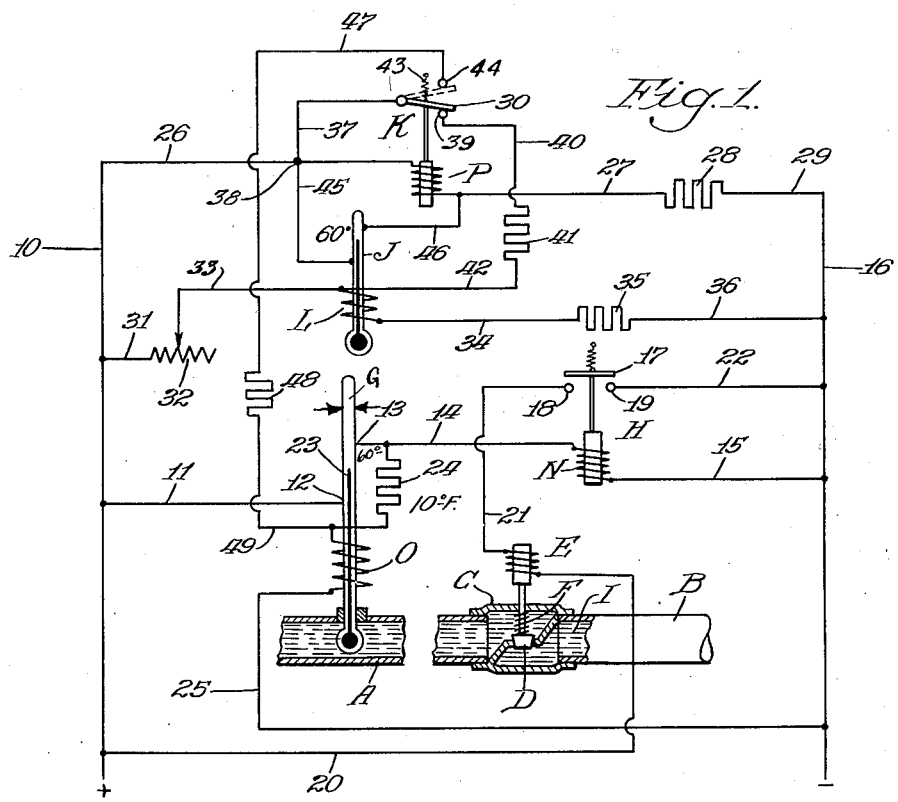
Fig. 1 illustrates certain control circuits of the present invention in connection with a temperature operating means in which a coolant fluid is circulated through a conduit within an enclosed space so that the temperature of the room is altered by varying the temperature of the coolant.

Referring first to Fig. 1 of the drawing, the temperature altering means includes a heat exchanger A located within the space whose temperature is being controlled and a supply conduit B for delivering a coolant fluid, either gas or liquid, to the heat exchanger A. The delivery of the coolant fluid from the supply conduit B to the heat exchanger A is controlled by a device C. This device is illustrated herein in the form of an electrically actuated valve D including a solenoid E. The valve is normally held in its closed position by a spring F and is opened by the energization of solenoid E. If the control circuits are utilized in connection with a temperature altering means (Fig. 2) which functions to alter the temperature of an enclosed space by adding heat thereto the valve D' is normally held in its open position by spring F' and is closed by the energization of solenoid E'.

The energization of the solenoid E is controlled by a thermostat G responsive to the temperature of the coolant. For example, when the control thermostat G of Fig. 1 reaches a predetermined temperature, for example 60° Fahrenheit, a circuit is closed through a relay H to actuate the same and thereby establishes an energizing circuit through the solenoid E. The energization of this solenoid opens the valve to permit a coolant medium I to be supplied to the heat exchanger A. Thermostat G responds to the temperature of the coolant medium I in the heat exchanger A. The said thermostat is constructed to function at a predetermined temperature, for example 60°, but this functional setting is adjusted temporarily by thermostat J. The last mentioned thermostat is arranged within the space whose temperature is being controlled and is responsive to the temperature of said space. The adjustment of thermostat G is effected by means of an auxiliary heater O adapted to be energized by the movement of a relay K to the dotted position shown in Fig. 1, which relay is controlled by the functioning of the said thermostat J.

The thermostat J may be adjusted by applying different amounts of auxiliary heat to the electric heater L. The amount of heating current supplied is varied by means of a variable resistor 32 interposed in the heating circuit.

The circuit for energizing the relay H, and thereby bring about the closing of an energizing circuit through the temperature altering means C, leads from positive line 10 through wire 11 to the lower contact 12 of thermostat G, thence through the mercury column of the thermostat to the upper contact 13 thereof and through wire 14, solenoid N of relay H, and wire 15 to the negative line 16. The energization of solenoid N moves its bridge arm 17 against fixed contacts 18 and 19 to close an energizing circuit through the solenoid E of the coolant valve D against the compression of spring F and thereby admits additional coolant fluid I to the heat exchanger A, whereby the additional coolant functions to lower the temperature of the entire body of coolant within the heat exchanger A. The said energizing circuit through solenoid E leads from the positive line 10 through wire 20, solenoid E, wire 21, contacts 17, 18 and 19 of relay H, and thence through wire 22 to the negative line 15. As soon as the temperature of the coolant I is lowered sufficiently to cause the mercury column 23 of thermostat G to recede below the upper contact 13, the circuit through the solenoid N of relay H is opened and thereby permits the bridge arm 17 thereof to move to a position to open said energizing circuit. However, such a breaking of the energizing circuit through the solenoid E will not occur so long as the mercury column 23 of thermostat G remains at or above the upper contact 13. Consequently, in order to keep the heat exchanger effective for a suitable period, auxiliary heat is applied to the thermostat G by means of an electric heater O. Preferably a sufficient amount of current is supplied to heater O to raise the temperature of thermostat G ten degrees. This is accomplished by directing current from the upper contact 13 through a resistor 24 of appropriate value, and thence through heater O and wire 25 to the negative line 16. It will be seen, therefore, that the temperature altering means will continue to supply coolant to the heat exchanger A until the temperature of the coolant body therein is lowered sufficiently to cause the mercury column 23 to move below the upper contact 13 of thermostat G. However, when the said mercury column 23 does move to a position below the upper contact 13 of thermostat G, the heating current to the auxiliary heater O is opened, the relay H is de-energized and the energizating circuit for the solenoid E is opened at said relay H.

The thermostat G, as before indicated, is caused to function by the operations of the master thermostat J. This thermostat is of the mercury column type provided with spaced contacts for controlling the energization of solenoid P of relay K. This solenoid is connected directly across the positive and negative lines by means of a wire 26 leading from the positive line 10 through solenoid P and thence through wire 27, resistor 28 and wire 29 to the negative line 16. Consequently the solenoid P is normally energized to hold the switch arm 30 of relay K in the full line position shown in Fig. 1 of the drawing. This full line position of the switch arm 30 may be maintained only momentarily since it normally closes a circuit, through the auxiliary heater L of thermostat J to produce a cycling action of the thermostat. The functional setting of thermostat J is controlled by a heating circuit which leads from the positive line through wire 31, variable resistor 32, wire 33, auxiliary heater L, and wire 34, resistor 35, and wire 36 to the negative line. The resistor 32 may be adjusted so as to direct any desired amount of heating current to the auxiliary heater L and thereby adjust the functional setting of the thermostat J. The cycling action of thermostat J results from the alternate heating and cooling of the auxiliary heater L by reason of the opening and closing of the heating circuit which leads from wire 26 through junction 38 and wire 37, switch arm 30 of relay K, fixed contact 39, wire 40, resistor 41, and wire 42 to the heater L, and thence through the wires 34, resistor 35, and wire 36 to the negative line. The resistor 41 preferably has a value of three degrees of heat. Consequently when the relay switch arm 30 is in the full line position three degrees of heat are added to the auxiliary heater L. However, as soon as the mercury column of the thermostat J engages the upper contact of the thermostat the electric current is by-passed around the solenoid P of relay K so as to permit the switch arm 30 to be moved by the spring 43 into engagement with contact 44. This by-passing circuit leads from wire 26 through wire 45, lower contact of thermostat J, thence through the mercury column to the upper contact and the wire 46 to the wire 27 and thence to the negative line.

The cycling action of thermostat J will continue until the temperature of the space in which the thermostat is located reaches the functional setting of its upper contact.

Each time that the mercury column of thermostat J engages its upper contact, the solenoid P is de-energized and permits the switch arm 30 to engage the fixed contact 44 and thereby closes a momentary heating circuit through the auxiliary heater O of thermostat G. This momentary heating circuit leads from the positive line through wire 26 and junction 38, wire 37, movable switch arm 30 to contact 44, thence through wire 47, resistor 48, and wire 49 to the auxiliary heater O, thence through wire 25 to the negative line. The heating current supplied to heater O, by virtue of the momentary de-energization of the relay K causes the mercury column 23 of thermostat G to engage its upper contact 13. As soon as this occurs, as previously indicated, an additional ten degrees of heat is added to the auxiliary heater O through the resistor 24 so as to force the mercury column a substantial distance above the upper contact 13, for example to the position indicated by the arrows in Fig. 1. The mercury column will be maintained in this position and consequently continue to energize relay H and solenoid E until the body of coolant within the heat exchanger has lowered in temperature sufficiently to cause the mercury column to recede to a position below the contact 13. In other words, the mercury column 23 will remain above contact 13 of thermostat G until the temperature of the coolant within the heat exchanger A is lowered ten degrees. At this time the circuit through solenoid N of relay H is de-energized to open the energizing circuit through coolant valve solenoid E.

Figure 2:
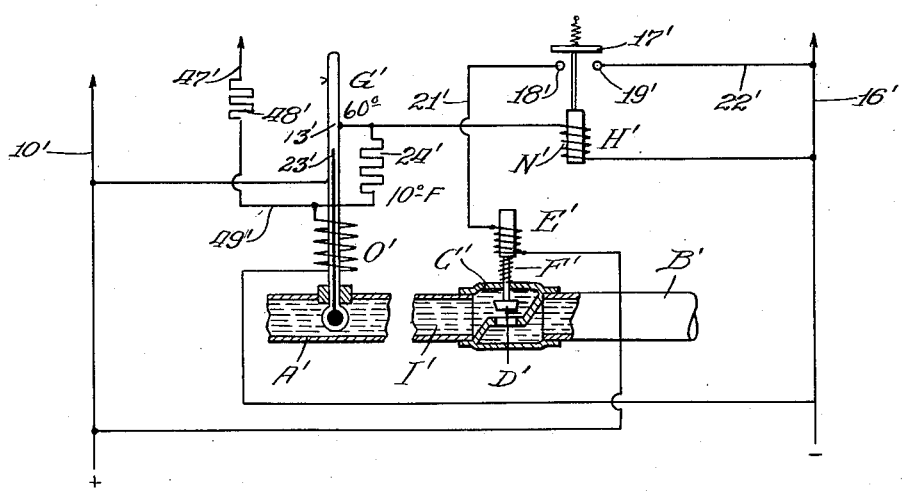
Fig. 2 illustrates a modified form of temperature altering means with which said circuits may be employed when the said temperature altering means functions to add heat to the enclosed space.

When the temperature altering means utilizes a heating medium to alter the temperature of the enclosed space the valve designated D', in Fig. 2 of the drawing, is normally held open by a spring F' and is closed by the energization of the solenoid E'. The thermostats and circuits for accomplishing this result are identical with the showing of Fig. 1 and, therefore, have been identified in Fig. 2 by corresponding reference characters having a prime exponent.

It will be seen by inspection of Fig. 2, that when the temperature of the heating medium I' in heat exchanger A' reaches the functional setting of the upper contact of thermostat G the relay H will be energized so as to close an energizing circuit through solenoid E' and thereby closes the supply valve D' to shut off the heating medium. Simultaneously with the closing of valve D' an additional ten degrees of heat will be supplied to the auxiliary heater O' through the resistor 24'. This condition will continue until the temperature of the heating medium within the heat exchanger A' is lowered sufficiently to cause the mercury column 23 to recede below the upper contact 13'. When this condition occurs the energizing circuit is broken through the relay H' and the energizing circuit through the solenoid E' is opened so as to permit more heating medium to flow into the heat exchanger A'. However, the breaking of the circuit through the upper contact also removes the ten degrees of heat from the auxiliary heater O'. Consequently the additional supply of heating medium to the heat exchanger A' will not be sufficient to raise the mercury column 23' to contact with the upper contact 13' of its thermostat without additional adjustment thereof through the functioning of the master thermostat J and relay K.

I claim:

1. A thermostatically controlled circuit comprising an electrically actuated device, means defining an energizing circuit therefor including a thermostat set to function at a predetermined temperature to close said circuit, means effective upon the functioning of the thermostat to hold said circuit closed while the temperature at the thermostat remains within a predetermined range from said functional setting comprising an electrical heater for the thermostat, an energizing circuit for the heater connected through the thermostat and a resistor interposed in said heater circuit and having a value corresponding to said temperature range, means defining a second energizing circuit through said heater including an on and off energized relay and a conductor leading from the relay and connected into the first mentioned heater energizing circuit at a location intermediate the heater and the said thermostat, and a second thermostat for controlling the energization of said relay.

2. A thermostatically controlled circuit comprising an electrically actuated device, means defining an energizing circuit therefor including a thermostat set to function at a predetermined temperature to close said circuit, means effective upon the functioning of the thermostat to hold said circuit closed while the temperature at the thermostat remains within a predetermined range from said functional setting comprising an electrical heater for the thermostat, an energizing circuit for the heater connected through the thermostat and a resistor interposed in said heater circuit and having a value corresponding to said temperature range, means defining a second energizing circuit through said heater including an on and off energized relay and a conductor leading from the relay and connected into the first mentioned circuit at a location intermediate the heater and said resistor, a second thermostat responsive to the temperature of the surrounding atmosphere for controlling the energization of said second relay, an electric heater for the second thermostat, and an energizing circuit for the last mentioned heater including a variable resistor, whereby the functional setting of the last mentioned thermostat may be altered.

3. In combination with apparatus for altering the temperature of an enclosed space including a heat exchanger for containing a medium for influencing the temperature of the enclosed space, an electrically actuated mechanism for controlling the delivery of said medium into said heat exchanger and thereby control the effectiveness of the said medium, an energizing circuit for said electrically actuated mechanism, an electrically energized relay for closing the last mentioned energizing circuit, a thermostat responsive to the temperature of said medium in said heat exchanger and set to function at a predetermined temperature to close the energizing circuit for said relay, and means effective upon the functioning of the thermostat to maintain said relay energizing circuit while the temperature of said medium remains within a predetermined range comprising an electrical heater for the thermostat, an energizing circuit therefor connected through the thermostat, and a resistor interposed in the heater circuit and having a value corresponding to said temperature range.

4. In combination with apparatus for altering the temperature of an enclosed space including a heat exchanger for containing a medium for influencing the temperature of the enclosed space, an electrically actuated mechanism for controlling the delivery of said medium into said heat exchanger and thereby control the effectiveness of the said medium, an energizing circuit for said electrically actuated mechanism, an electrically energized relay for closing the last mentioned, energizing circuit, a thermostat responsive to the temperature of said medium in said heat exchanger and set to function at a predetermined temperature to close the energizing circuit for said relay, means for adjusting the functional setting of said thermostat comprising an electric heater for the thermostat, an energizing circuit therefor including a second relay for opening and closing said heater energizing circuit, a thermostat responsive to the temperature of the enclosed space for controlling the energization of said second relay, and means effective upon the functioning of the first mentioned thermostat for maintaining the energizing circuit through the first mentioned relay while the temperature at the first mentioned relay is within a predetermined range comprising means defining an electric circuit connected through said first mentioned thermostat for supplying additional heating current to said electric heater, and a resistor interposed in the last mentioned circuit and having a value corresponding to the said temperature range.

5. In combination with apparatus for altering the temperature of an enclosed space including a heat exchanger for containing a medium for influencing the temperature of the enclosed space, an electrically actuated mechanism for controlling the delivery of said medium into said heat exchanger and thereby control the effectiveness of the said medium, an energizing circuit for said electrically actuated mechanism, an electrically energized relay for closing the last mentioned energizing circuit, a thermostat responsive to the temperature of said medium in said heat exchanger and set to function at a predetermined temperature to close the energizing circuit for said relay, means for adjusting the functional setting of said thermostat comprising an electric heater for the thermostat, an energizing circuit therefor including a second relay for opening and closing said heater energizing circuit, a thermostat responsive to the temperature of the enclosed space for controlling the energization of said second relay, an electric heater for this thermostat, an energizing circuit for by-passing electric current around the second relay to deenergize the same, whereby said heating circuit through said first heater is opened and closed, and means effective upon the functioning of the first mentioned thermostat for maintaining the energizing circuit through the first mentioned relay while the temperature at the first mentioned relay is within a predetermined range comprising means defining an electric circuit connected through said first mentioned thermostat for supplying additional heating current to said electric heater, and a resistor interposed in the last mentioned circuit and having a value corresponding to the said temperature range.

TIMOTHY J. LEHANE.

REFERENCES CITED

The following references are of record in the file of this patent:

UNITED STATES PATENTS

| Number | Name | Date |
| --- | --- | --- |
| 1,793,954 | Myers | Feb. 24, 1931 |
| 1,819,588 | Bennett | Aug. 18, 1931 |
| 1,916,671 | Hauser | July 4, 1933 |
| 2,181,427 | Grant | Nov. 28, 1939 |
| 2,238,219 | Fineran | Apr. 15, 1941 |